United States Patent
Apunevich et al.

[11] Patent Number: 6,156,994
[45] Date of Patent: Dec. 5, 2000

[54] ARC-PLASMA METHOD FOR WELDING METALS

[76] Inventors: Alexandr Ivanovich Apunevich, Konakovsky Probzd, D. 13, KV. 36, 125565 Moscow, Russian Federation; Evgeny Ivanovich Titarenko, Zelenograd, D. 1455, KV.64, 103617 Moscow, Russian Federation

[21] Appl. No.: 09/380,331

[22] PCT Filed: Feb. 17, 1998

[86] PCT No.: PCT/RU98/00040

§ 371 Date: Oct. 15, 1999

§ 102(e) Date: Oct. 15, 1999

[87] PCT Pub. No.: WO98/39133

PCT Pub. Date: Nov. 9, 1998

[30] Foreign Application Priority Data

Mar. 3, 1997 [RU] Russian Federation ............. 97102836

[51] Int. Cl.⁷ .................................................. B23K 10/00
[52] U.S. Cl. ................................. 219/121.46; 219/121.45; 219/121.36; 219/121.59; 219/75
[58] Field of Search ........................ 219/121.45, 121.46, 219/121.59, 121.51, 74, 75, 121.36, 137 R

[56] References Cited

U.S. PATENT DOCUMENTS

| | | |
|---|---|---|
| 3,567,898 | 3/1971 | Fein . |
| 3,830,428 | 8/1974 | Dyos . |
| 4,311,897 | 1/1982 | Yerushalmy . |
| 4,531,043 | 7/1985 | Zverina et al. . |
| 4,639,570 | 1/1987 | Zverina et al. ............................ 219/75 |
| 4,791,268 | 12/1988 | Sanders et al. . |
| 5,609,777 | 3/1997 | Apunevich et al. . |
| 5,660,743 | 8/1997 | Nemchinsky . |
| 5,783,795 | 7/1998 | Gilman et al. ..................... 219/121.45 |
| 5,906,757 | 5/1999 | Kong et al. ........................ 219/121.47 |
| 5,914,055 | 6/1999 | Roberts et al. ...................... 219/76.15 |

FOREIGN PATENT DOCUMENTS

| | | |
|---|---|---|
| 844178 | 8/1981 | Russian Federation . |
| 880654 | 11/1981 | Russian Federation . |
| 428646 | 6/1982 | Russian Federation . |
| 479583 | 12/1982 | Russian Federation . |
| 1655702 | 6/1991 | Russian Federation . |
| 1680463 | 9/1991 | Russian Federation . |
| 1683927 | 10/1991 | Russian Federation . |
| WO94/19139 | 9/1994 | WIPO . |

OTHER PUBLICATIONS

E.D. Kafitin "Plazmennaya obrabotka metallov", 1969, Moxcow, Spetsializirovanny informatsionny tsentr po teknologii avtomobilestroenya, pp. 22–23, 38.

B. Paton, 1979, "Microplasma–arc Welding", Ukraine, Kiev, "Naukova dumka" publishers pp. 19–21.

*Primary Examiner*—Mark Paschal
*Attorney, Agent, or Firm*—Collard & Roe, P.C.

[57] ABSTRACT

In a method for plasma-arc welding of metals with a direct or indirect arc, used as a plasma-producing medium is the vapor of a water-containing fluid doped with an organic solvent appearing as oxygen-containing hydrocarbon compounds, in particular, alcohols, and vapors are generated immediately in the plasma-arc torch.

8 Claims, 2 Drawing Sheets

ARC-PLASMA METHOD FOR WELDING METALS

TECHNICAL FIELD

The present invention relates to methods for plasma-arc welding of metals and can find application in mechanical engineering, construction engineering, and in other industries.

BACKGROUND ART

Methods for plasma-arc Welding of metals using the direct constricted-arc welding technique are in widespread use currently, wherein metal is fused with a plasma jet (cf. U.S. Pat. No. 4,791,268, IPC B23K 9/00, 1988; SU #1,683, 927, IPC B23K 10/00, 1991). Extensively used nowadays are also methods for welding metals with a direct constricted arc stricken between the plasmatron electrodes and the workpiece (cf. SU #880,6,54, IPC B23K 10/02, 1981; the textbook "Microplasma-arc welding" ed. by B. Ye. Patton, Ukraine, Kiev, "Naukova dumlka" publishers, 1979, pp.19–21 (in Russian). The methods mentioned above provide for establishing a plasma jet by constricting an arc discharge with an inert gas to obtain quality welded joints. However, provision of an external inert-gas source involves some operational inconveniences in carrying said method into effect, while high production cost of the inert gas and considerable expenses for recharging gas bottles impose substantial limitation on practical applicability of the aforementioned method of plasma-arc welding. In addition, handling easily inflammable metals involves using not only a plasma-producer gas but also a shielding gas (cf. SU #1,680, 463, IPC B23J 10/02, 1991).

Known in the present-state welding practice are plasma-arc welding torches (plasmatrons), wherein used for establishing a plasma jet is vapor fed from a special vapor generator or generated in the welding torch itself by evaporating the fluid by virtue of the heat released on the electrodes (cf. PCT RU Application #93/00053 published Sep. 1, 1994 under # WO/94/19139). The latter torch is most economic and simple in operation, though its use in welding is difficult due to intense metal oxidizing caused by the presence of vapor and molecular and atomic oxygen in the plasma jet.

DISCLOSURE OF THE INVENTION

The present invention is aimed at the provision of a method for plasma-arc welding of metals using vapor as a plasma-producer medium ensuring high-quality welded joints due to reduced oxidizing properties of the plasma jet. The essence of the invention resides in that in a method for plasma-arc welding of metals with a direct or indirect constricted arc comprising constricting the arc with a plasma-producer medium to obtain a plasma jet, used as the plasma-producer medium is the vapors of a fluid containing water doped with an organic solvent appearing as oxygen-containing hydrocarbon compounds capable of preventing oxygen atoms and molecules contained in said vapors from entering into oxidation reaction with the metal being handled.

It is found experimentally that the best results is obtained when used as the additives are alcohols, their optimum percentage content in the vapor-generating fluid from the viewpoint of energetics and welded joint strength being within 30 and 50. When the percentage of alcohols in the mixture is below the lower limit, a larger proportion of scale occurs in the welded joint which in turn affects adversely its strength characteristics. In case the percentage of alcohols in the mixture exceeds 50, the miscibility of the organic solvent with water is affected with the resultant stratification of the mixture and hence its nonuniform evaporation. Moreover, vapor enthalpy is reduced in this case which in turn reduces the plasma-jet temperature. Best results were obtained when using a plasma-arc welding torch, wherein the plasma-producing vapor is obtained from a fluid most commonly used in every-day life, consisting of 60% water and 40% ethanol.

Vapor can be generated immediately in the plasma-arc torch by evaporating the fluid filling a special container, by virtue of heat energy generated by the arc burning between the torch electrodes.

The herein-proposed method for plasma-arc welding of metals can be carried out using both indirect plasma-arc torches, wherein heat energy is transferred to the workpiece directly by the plasma jet emerging from the nozzle-anode of the welding torch and direct plasma-arc torches, wherein the workpiece is acted upon by a plasma-jet-stabilized arc. In the latter case used for fusing metals is not only the plasma-jet energy but also the energy of the electric arc which adds substantially to the energy characteristics of the method.

DETAILED DESCRIPTION OF PREFERRED EMBODIMENTS

Variants of Practical Embodiment of the Invention

Figure 1:
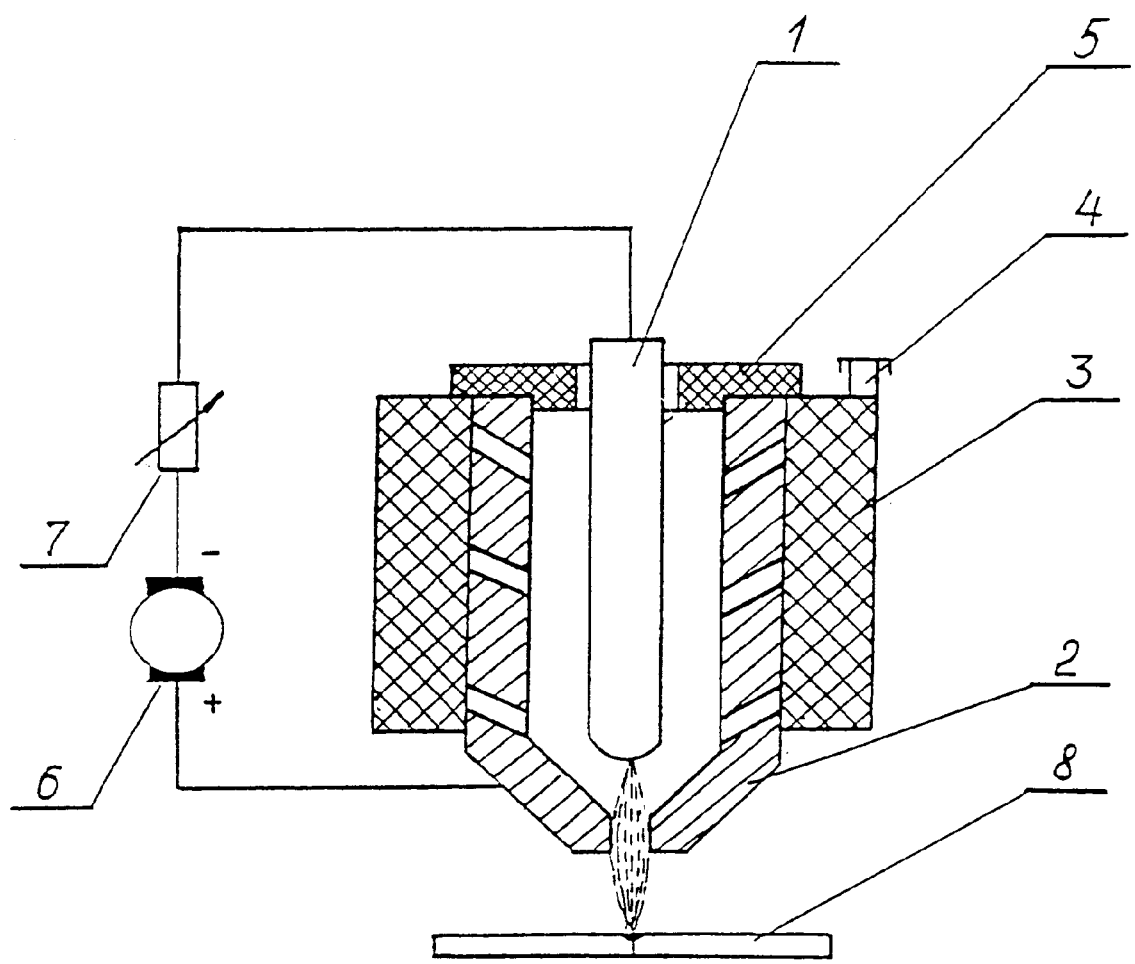
FIG. 1 presents schematically a device for welding metals with an indirect plasma-arc.

Given below are some exemplary embodiments of the proposed method. FIG. 1 presents schematically a device for welding metals with an indirect plasma-arc. The device comprises a plasma-arc torch (plasmatron) incorporating a cathode (1), a nozzle-anode (2) provided with passages for a plasma-producing medium, a container (3) filled with a moisture absorbent material and having an inlet (4), an electrically-insulated cover (3) and a power source (6) with a current regulator (7). Used as the moisture absorbent material may be kaolin wool, carbon fabric, or carbon felt, and as the vapor-producer fluid, e.g., a mixture of water with ethanol or acetone.

Welding is carried out as follows.

The inlet (4) of the container (3) is opened and the aforementioned fluid is filled therein, whereupon the inlet is closed. Then a voltage is applied to the cathode and the nozzle-anode. Next an arc is initiated be, e.g., reciprocating the cathode until it contacts the nozzle-anode. The heat energy released by the burning arc on the nozzle-anode causes the fluid held in the container (3) to evaporate. The resultant vapor enters the discharge chamber via the passages of the nozzle-anode and emerge through the central nozzle opening, thus drawing the arc-gaseous column. The vapor is then heated to high temperatures due to the arc-gaseous column being constricted in the opening of the nozzle-anode, and thus goes into the plasma state to establish a plasma jet at the outlet of the nozzle-anode, whereupon the resultant plasma jet is directed at the welding spot to bring the metal to the fusion point. The arc current is varied by the regulator (7).

Figure 2:
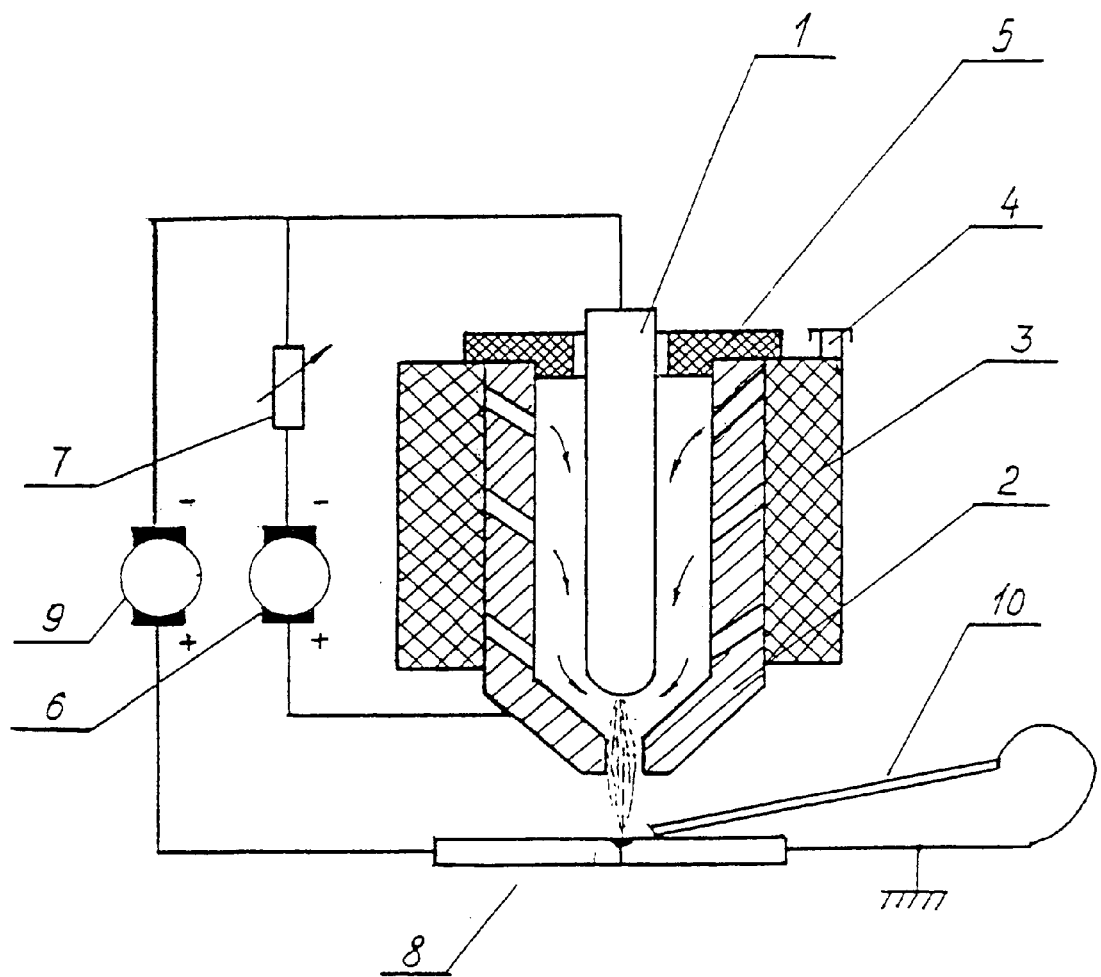
FIG. 2 presents schematically a device for welding metals with a direct plasma arc.

FIG. 2 presents schematically a device for welding metals with a direct plasma-arc. The device comprises a plasma-arc torch incorporating a cathode (1), a nozzle-anode (2) provided with passages for a plasma-producing medium, a container (3) filled with a moisture absorbent material and having an inlet (4), an electrically-insulated cover (5), a power source (6) with a current regulator (7), as well as a second power source (9) cut in between the cathode (1) and the metal (8) being welded.

Welding is carried out as follows.

A plasma jet is established at the outlet of the nozzle-anode (2) as described hereinbefore. Once the torch has got steady-state temperature conditions, a voltage is applied from the second power source (9) across the cathode 1 and the metal 8 being welded. Then the plasma jet is directed onto the welding spot, and the space between the nozzle-anode and the metal being welded is reduced until a Direct arc is initiated therebetween and the metal (8) is fused. The depth of fusion are changed by changing the first arc current using the current regulator (7) by so selecting the regulator position as, on the one hand, to prevent molten metal from being blown out of the weld puddle and on the other hand, to provide a steady stabilization of the direct arc position.

Whenever a filling material (10) is used, it is electrically connected to the metal being welded and is brought into the plasma jet as necessary, wherein said material is fused under the action of the direct arc and fills the weld puddle formed on the surface of the metal being welded.

INDUSTRIAL APPLICABILITY

Pilot models of the device the diagrams of which are present in the specification are found to ensure welding of steel structures having the sheet thickness of 3 to 5 mm and the depth of fusion from 3 to 4 mm, when the aforementioned operations making the essence of the proposed method have been carried out in the specified sequence.

What is claimed is:

1. A method of plasma-arc welding of metals with indirect plasma-arc torch, comprising the following steps:

striking a pilot electric arc between the electrode and the nozzle, said nozzle comprising an anode of the plasma-arc welding torch, constricting the pilot arc with plasma-producing medium and producing as a result a plasma jet emerging from the nozzle, fusing the metal with said plasma jet, characterized in that used as the plasma-producing medium is vapor of a liquid containing water doped with an organic solvent comprising an oxygen-containing hydrocarbon compound.

2. The method of claim 1 wherein the oxygen-containing hydrocarbon compound comprises an alcohol.

3. The method of claim 2 wherein the plasma-producing medium comprises between 30 and 50 percent alcohol.

4. The method of claim 1 wherein the vapor is generated directly in the plasma-arc welding torch by virtue of heat energy evolved by the pilot arc.

5. A method of plasma-arc welding of metals with direct plasma-arc torch, comprising the following steps:

striking a pilot electric arc between the electrode and the nozzle, said nozzle comprising an anode of the plasma-arc welding torch, constricting the pilot arc with plasma-producing medium and producing as a result a plasma jet emerging from the nozzle, establishing the main electric arc between the electrode of the plasma-arc welding torch and the metal being welded, fusing the metal with the main electric arc stabilized with said plasma jet, characterized in that used as the plasma-producing medium is vapor of a liquid containing water doped with an organic solvent comprising an oxygen-containing hydrocarbon compound.

6. The method of claim 5 wherein the oxygen-containing hydrocarbon compound comprises an alcohol.

7. The method of claim 6 wherein the plasma-producing medium comprises between 30 and 50 percent alcohol.

8. The method of claim 5 wherein the vapor is generated directly in the plasma-arc welding torch by virtue of heat energy evolved by the pilot arc.

* * * * *